(12) United States Patent
Hayakawa

(10) Patent No.: US 7,688,691 B2
(45) Date of Patent: Mar. 30, 2010

(54) SIGNAL PROCESSING APPARATUS AND METHOD FOR OPTICAL DISK SYSTEM

(75) Inventor: Yasumasa Hayakawa, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 1306 days.

(21) Appl. No.: 11/171,502

(22) Filed: Jul. 1, 2005

(65) Prior Publication Data
US 2006/0007804 A1    Jan. 12, 2006

(30) Foreign Application Priority Data
Jul. 7, 2004    (JP)    ............................ 2004-201033
Jul. 7, 2004    (JP)    ............................ 2004-201034

(51) Int. Cl.
G11B 7/00    (2006.01)
(52) U.S. Cl. .............. 369/44.29; 369/44.35; 369/47.25; 369/124.11
(58) Field of Classification Search ........................ None
See application file for complete search history.

(56) References Cited

U.S. PATENT DOCUMENTS

| 5,014,256 | A | * | 5/1991 | Horie et al. | ............... | 369/44.35 |
| 5,048,002 | A | * | 9/1991 | Horie et al. | ............... | 369/44.35 |
| 5,600,615 | A | * | 2/1997 | Kiyoura et al. | .......... | 369/44.35 |

FOREIGN PATENT DOCUMENTS

| JP | 61-39978 | 2/1986 |
| JP | 2-99831 | 4/1990 |
| JP | 05-120693 | 5/1993 |
| JP | 9-330564 | 12/1997 |
| JP | 10-302398 | 11/1998 |
| JP | 2000-235771 | 8/2000 |
| JP | 2001-216735 | 8/2001 |
| JP | 2001-319424 | 11/2001 |
| JP | 2002-319137 | 10/2002 |

OTHER PUBLICATIONS

Japan Notification of Reasons for Rejection for Application No. 2004-201033 mailed Jun. 16, 2009 (with English Translation), 4 pages.
Japan Notification of Reasons for Rejection for Application No. 2004-201034 mailed Jul. 7, 2009 (with English Translation), 6 pages.

* cited by examiner

Primary Examiner—Joseph H Feild
Assistant Examiner—Christopher R Lamb
(74) Attorney, Agent, or Firm—Fish & Richardson P.C.

(57) ABSTRACT

A signal processing apparatus for an optical disk system which apparatus has a variable gain amplifier that amplifies with a variable gain a light-detected signal obtained from an optical disk on which to perform playback processing so as to make a level of the light-detected signal coincide with a first reference level. The apparatus comprises a comparator that compares the level of the light-detected signal amplified by the variable gain amplifier with the first reference level; a gain adjuster that generates and supplies a control signal to adjust the variable gain according to a result of the comparing to the variable gain amplifier; and a gain adjustment controller that, when the level of the light-detected signal amplified is within a level range including the first reference level, controls a level of the control signal of the gain adjuster to be held at its preceding value.

5 Claims, 12 Drawing Sheets

| | PEAK LEVEL ≦ FIRST REFERENCE LEVEL | PEAK LEVEL > FIRST REFERENCE LEVEL |
|---|---|---|
| COMPARATOR OUTPUT | H LEVEL | L LEVEL |

| | PEAK LEVEL WITHIN HOLD RANGE (WHEN AND AFTER INTERSECTING FIRST REFERENCE LEVEL) | PEAK LEVEL OUTSIDE HOLD RANGE |
|---|---|---|
| HOLD RANGE DETERMINING SECTION OUTPUT | H LEVEL | L LEVEL |

| COMPARATOR OUTPUT | HOLD RANGE DETERMINING SECTION OUTPUT | COUNTER OPERATION MODE |
|---|---|---|
| L LEVEL | L LEVEL | COUNT-DOWN |
| L LEVEL | H LEVEL | COUNT-HOLD |
| H LEVEL | L LEVEL | COUNT-UP |
| H LEVEL | H LEVEL | COUNT-HOLD |

FIG.5

|  | PEAK LEVEL ≤ FIRST REFERENCE LEVEL | PEAK LEVEL > FIRST REFERENCE LEVEL |
|---|---|---|
| COMPARATOR OUTPUT | H LEVEL | L LEVEL |
| COUNTER OPERATION MODE | COUNT-UP | COUNT-DOWN |

FIG.11

SIGNAL PROCESSING APPARATUS AND METHOD FOR OPTICAL DISK SYSTEM

CROSS-REFERENCE TO RELATED APPLICATIONS

The present application claims priority from Japanese Patent Application No. 2004-201033 filed on Jul. 7, 2004, and Japanese Patent Application No. 2004-201034 filed on Jul. 7, 2004, which are herein incorporated by reference.

BACKGROUND OF THE INVENTION

1. Field of the Invention

The present invention relates to a signal processing apparatus and method for an optical disk system.

2. Description of the Related Art

An optical pickup is an apparatus that performs record/playback of information on/from optical disks by using an optical system that is a combination of a light source, a lens, a photo-detector, and the like. A signal obtained by this optical pickup from the optical disk (hereinafter, called a light-detected signal) varies in level due to variations in characteristics of optical disks such as reflectivity, variation in the manufacture of the optical system including the photo-detector of the optical pickup, variation in the amount of light depending on an operation mode, either a record, playback, or erase, and the like. Accordingly, optical disk systems to perform record/playback of optical disks are usually provided with an AGC (Auto Gain Control) circuit to make the level of the light-detected signal coincide with a predetermined reference level. See, for example, Japanese Patent No. 3272003.

FIG. 15 is a diagram showing an optical disk system having a conventional AGC circuit 40. Information recorded on an optical disk 10 is read out by an optical pickup 20 in the form of returned laser light, and is converted to electricity to obtain a light-detected signal. This light-detected signal is a signal on which a DSP 50 performs various optical disk playback processes (such as decoding and a servo process). An RP signal, an FE (Focus Error) signal, a TE (Tracking Error) signal, and the like are produced from the light-detected signal.

Note that because the light-detected signal is minute in level at the stage of being detected by the optical pickup 20, a preamplifier 30 amplifies the light-detected signal to a level that can be handled by the DSP (Digital Signal Processor) 50 and the like at the later stage. And, the light-detected signal amplified by the preamplifier 30 is supplied to the AGC circuit 40 to accommodate to the level variation. As a result, the light-detected signal stabilized at an almost constant level is supplied to the DSP 50, and after decoded according to the standard of the optical disk 10, is outputted as a playback signal (an audio signal, a CD-ROM signal, a video signal, etc.) to a speaker 60 and the like.

The AGC circuit 40 is constituted by an analog circuit comprising a VCA (Voltage Control Amplifier) 41 that amplifies or attenuates the light-detected signal with a variable gain according to a control voltage, a detector 42 for detecting the output of the VCA 41, and a VCA control circuit 43 that generates and supplies the control voltage to make the output of the VCA 41 detected by the detector 42 coincide with the predetermined reference level to the VCA 41. An internally generated voltage obtained by dividing a supply voltage VCC according to a predetermined ratio is usually used as the reference level in the VCA control circuit 43.

However, with a conventional mechanism for stabilizing the level of the light-detected signal like the AGC circuit 40 of FIG. 15, various noise factors such as variations in characteristics of the optical disk and the optical pickup depending on environmental conditions and the like, and variations in the amount of reflected light due to stains or scratches on the optical disk may cause unexpected, minute variation in the level of the light-detected signal.

In the conventional mechanism, the stabilization reference for the light-detected signal is set at a fixed level by an analog component such as a voltage divider. Hence, the conventional mechanism is not flexible enough to deal with the unexpected, minute variation in the level of the light-detected signal, but allows the level control to follow the minute level variation. As such, with the conventional mechanism, it is difficult for the light-detected signal to settle in level, and thus the problem occurs that optical disk playback processing cannot be appropriately performed on the light-detected signal.

SUMMARY OF THE INVENTION

To solve the above and other problems, according to one aspect of the present invention there is provided a signal processing apparatus for an optical disk system which apparatus has a variable gain amplifier that amplifies with a variable gain a light-detected signal obtained from an optical disk on which to perform playback processing so as to make a level of the light-detected signal coincide with a first reference level, the apparatus comprising a comparator that compares the level of the light-detected signal amplified by the variable gain amplifier with the first reference level; a gain adjuster that generates and supplies a control signal to adjust the variable gain according to a result of the comparing to the variable gain amplifier; and a gain adjustment controller that, when the level of the light-detected signal amplified is within a level range including the first reference level, controls a level of the control signal of the gain adjuster to be held at its preceding value.

According to the present invention, there is provided a signal processing apparatus and method for an optical disk system that can appropriately perform the optical disk playback processing.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 5 is a diagram for explaining the operation of a counter according to the first embodiment of the present invention;

FIG. 11 is a diagram for explaining the operation of the VCA controller according to the third embodiment of the present invention;

DETAILED DESCRIPTION OF THE INVENTION

At least the following matters will be made clear by the explanation in the present specification and the description of the accompanying drawings.

First Embodiment

<<Optical Disk System>>

Figure 1:
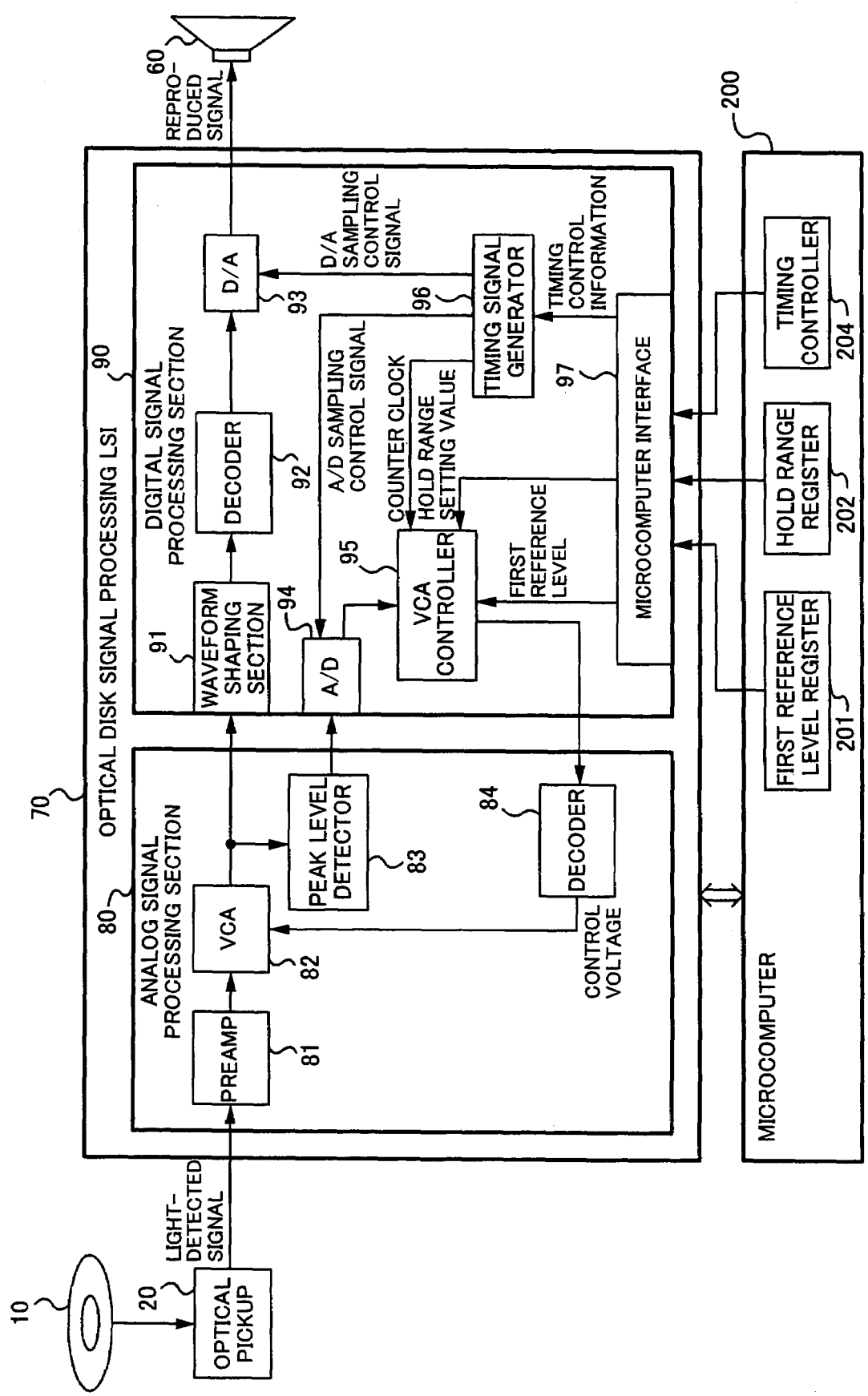
FIG. 1 is a diagram illustrating the configuration of an optical disk system according to a first embodiment of the present invention.
Figures 2, 3, 4:
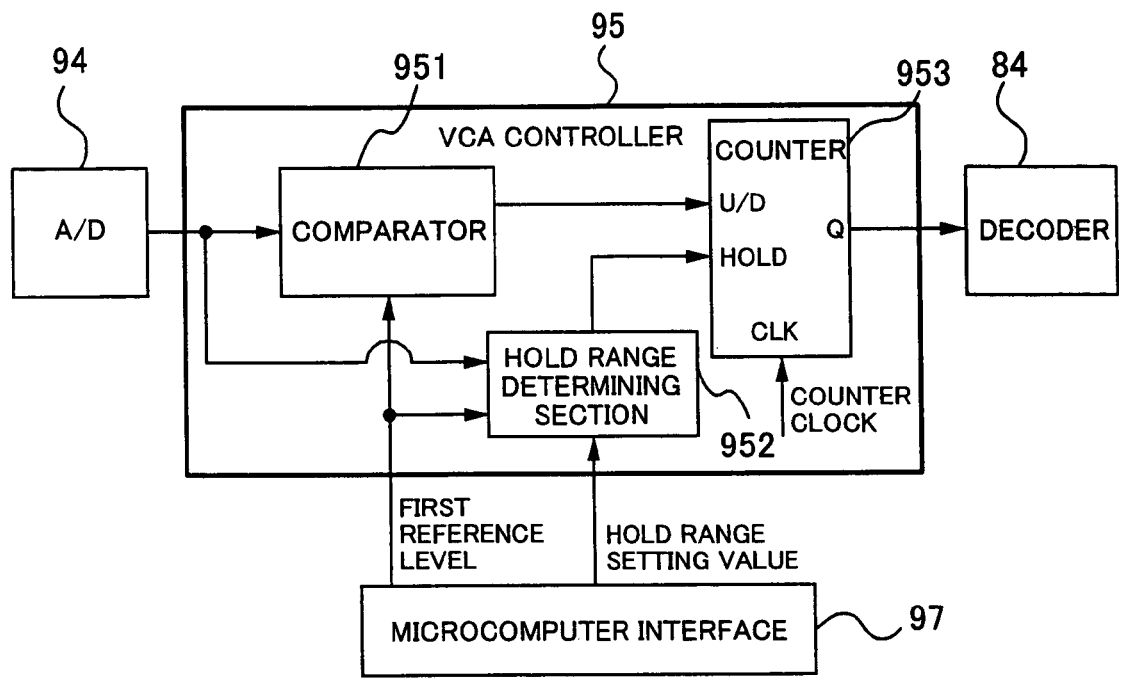
FIG. 2 is a diagram illustrating the configuration of the VCA controller according to the first embodiment of the present invention.
FIG. 3 is a diagram for explaining the operation of a comparator according to the first embodiment of the present invention.
FIG. 4 is a diagram for explaining the operation of a hold range determining section according to the first embodiment of the present invention.

With reference to FIG. 2, the configuration and operation of an optical disk system according to a first embodiment of the present invention will be described based on FIG. 1.

Figure 15:
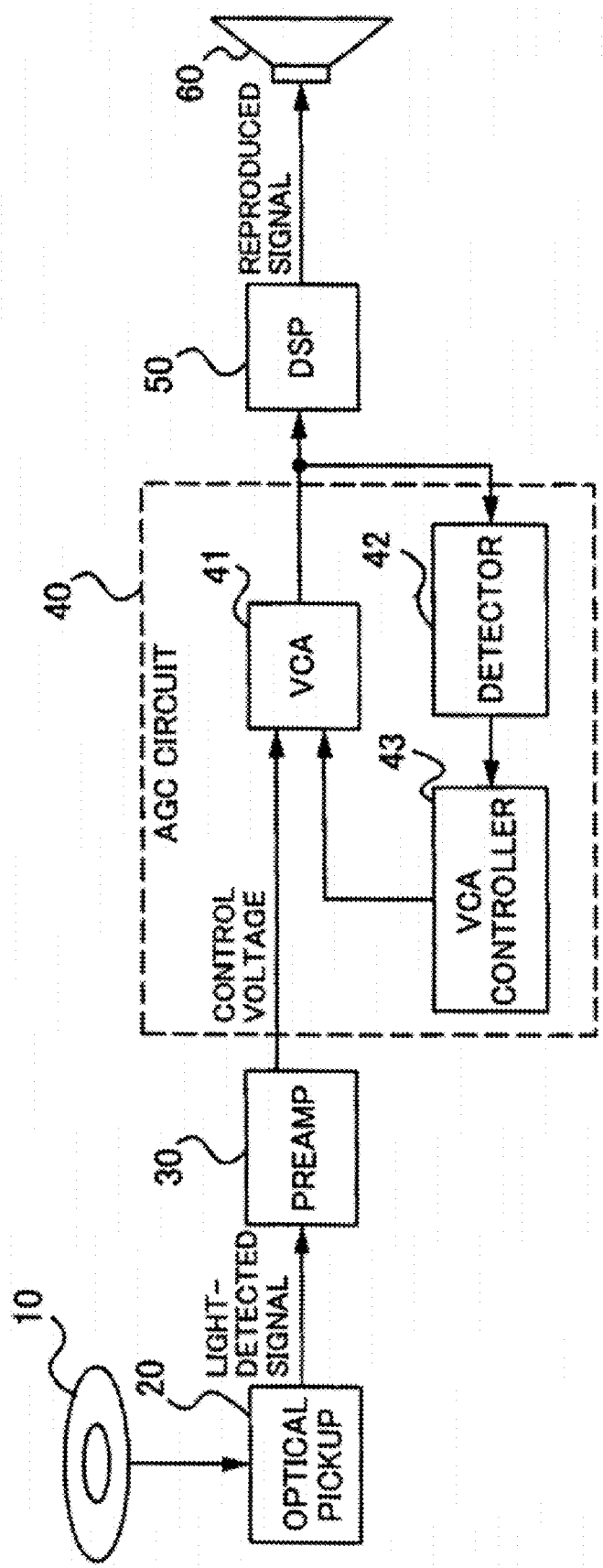
FIG. 15 is a diagram illustrating the configuration of a conventional optical disk system.

The optical disk system that performs record/playback of an optical disk 10 compliant with a CD standard (CD-ROM, CD-R/RW, or the like) or a DVD standard (DVD±R/RW, DVD-RAM, or the like) comprises an optical pickup 20, an optical disk signal processing LSI 70, a microcomputer 200, actuators and their driver circuits for various servo controls such as focusing, tracking, and spindle (none are shown), and an external playback output device such as a speaker 60. Note that like components as in the conventional optical disk system of FIG. 15 are denoted by the same reference numerals with a description thereof omitted.

The microcomputer 200 controls the whole optical disk system, and comprises particularly a first reference level register 201 to store a first reference level that is a reference to determine the stabilized/not-stabilized of the output of a VCA 82 with, a hold range register 202 to store a hold range setting value to set a blind band (hold range) in gain control by a VCA controller 95 for the VCA 82 (hereinafter called "VCA control"), and a timing controller 204 for controlling various timings in the optical disk signal processing LSI 70.

Timing signals used in the optical disk signal processing LSI 70 and controlled by the timing controller 204 include counter clocks supplied to the VCA controller 95 to generate a control voltage to the VCA 82, an A/D sampling control signal for controlling the sampling in an A/D converter 94, a D/A sampling control signal for controlling the sampling in a D/A converter 93, and the like. That is, the timing controller 204 supplies information (hereinafter called timing control information) for controlling the timing signals to a timing signal generator 96 via a microcomputer interface 97.

The counter clocks generated by the timing signal generator 96 have a frequency arbitrarily set at one of a plurality of predetermined counter frequencies. The timing signal generator 96 is constituted, for example, by a PLL circuit comprising a voltage controlled oscillator, a divider whose divisor is settable, a phase comparator, and the like, and the counter clocks are obtained from the oscillation output of the voltage controlled oscillator of the PLL circuit. That is, by changing the divisor of the divider of the PLL circuit, the frequency of the counter clocks (hereinafter called a "counter clock frequency") can be arbitrarily set.

The A/D sampling control signal generated by the timing signal generator 96 has a frequency arbitrarily set at one of predetermined sampling frequencies.

The optical disk signal processing LSI 70 is an integrated circuit wherein an analog signal processing section 80 and a digital signal processing section 90 are integrated into one chip by using a CMOS process technology. Although the analog signal processing section 80 and the digital signal processing section 90 can each be realized as an individual chip, lowering power consumption, chip area reduction, cost reduction, and the like can be achieved by integrating into one chip as shown in FIG. 1.

The analog signal processing section 80 performs analog signal processing such as shaping the waveform of the light-detected signal detected by the optical pickup 20 and APC (Automatic Power Control) for laser emission output of the optical pickup 20. Note that the analog signal processing section 80 of FIG. 1 has a preamplifier 81, a VCA 82, a peak level detector 83, and a decoder 84 that form a mechanism for accommodating to variation in the level of the light-detected signal.

The preamplifier 81 is provided in between the optical pickup 20 and the VCA 82, that is, at the stage preceding the VCA 82, and amplifies the light-detected signal obtained from the optical pickup 20 to a level that can be handled by the optical disk signal processing LSI 70. Also, the preamplifier 81 can change the direct-current level of the light-detected signal obtained from the optical pickup 20 according to an offset adjustment amount set in an offset adjuster 99 described later. Note that the preamplifier 81 is an embodiment of the "preamplifier" according to the present invention.

The VCA 82 amplifies or attenuates the light-detected signal with a variable gain according to the control voltage. Note that the VCA 82 is an embodiment of the "variable gain amplifier" according to the present invention, that the variable gain of the VCA 82 is the "variable gain" according to the present invention, and that the control voltage for setting the variable gain of the VCA 82 is the "control signal" according to the present invention.

The peak level detector 83 detects the peak levels of the VCA 82 output. Instead, a mechanism for detecting the bottom levels of the VCA 82 output or a mechanism for detecting wave heights, that is, the differences between the peak levels and the bottom levels of the VCA 82 output may be adopted.

The decoder 84 decodes a control signal outputted from the VCA controller 95 and generates the control voltage for controlling the VCA 82.

The digital signal processing section 90 performs playback digital signal processing including decoding such as EFM or EFMPLUS demodulation and error correction, servo control such as focusing and tracking, and record digital signal processing including encoding such as EFM modulation and error correction encoding and write strategy control. Note that the functions of the digital signal processing section 90 are realized by hardware and dedicated programs using MAC (Multiply and Accumulation) of a DSP.

The digital signal processing section 90 has a waveform shaping section 91, a decoder 92, and a D/A converter 93 as a mechanism for performing the playback digital signal processing, and has the A/D converter 94 and a VCA controller 95 as a mechanism for compensating for (accommodating to) the level variation of the light-detected signal. Further, the digital signal processing section 90 has a timing signal generator 96 that generates various timing signals for the optical disk signal processing LSI 70 based on the timing control information supplied from the microcomputer 200 via the microcomputer interface 97, and the microcomputer interface 97 for sending and receiving signals to and from the microcomputer 200.

First, the optical disk playback mechanism of the digital signal processing section 90 will be described. The waveform shaping section 91 binarizes the VCA 82 output thereby converting into an EFM or EFMPLUS signal. The decoder 92 performs predetermined decoding according to the standard of the optical disk 10 on the EFM or EFMPLUS signal. For example, Lch and Rch audio signals, which are reproduced signals, obtained by this decoding are converted by the D/A converter 93 into analog signals, which are outputted to the speaker 60.

Next, the mechanism for accommodating to the level variation of the light-detected signal in the digital signal processing section 90 will be described. It is assumed that the reference level is already set in the VCA controller 95 by the microcomputer 200. The A/D converter 94 samples the peak levels of the VCA 82 output detected by the peak level detector 83 according to an A/D sampling control signal supplied from the microcomputer 200 and quantizes the sampled peak levels to quantization numbers. In the description below, unless otherwise stated, the peak level of the VCA 82 output refers to the peak level of the VCA 82 output sampled and quantized by the A/D converter 94.

When the peak level of the VCA 82 output is at or below a reference level, the VCA controller 95 raises the control voltage to be supplied to the VCA 82 by one step and, when the peak level of the VCA 82 output is above the reference level, lowers it by one step. By repeating this VCA control, the level variation of the light-detected signal is accommodated to.

<<Configuration of the VCA Controller>>

With reference to FIGS. 3, 4, and 5 as needed, the configuration of the VCA controller 95 according to the first embodiment of the present invention will be described based on FIG. 2. Note that the VCA controller 95 is an example of the "gain adjuster" according to the first embodiment of the present invention, that a first reference level used in the VCA controller 95 is the "first reference level" according to the first embodiment of the present invention, and that a hold range used in the VCA controller 95 is the "level range" according to the first embodiment of the present invention.

As shown in FIG. 2, the VCA controller 95 comprises a comparator 951, a hold range determining section 952, and a counter 953.

The comparator 951 compares the peak levels of the VCA 82 output supplied from the A/D converter 94 with the first reference level supplied from the microcomputer 200 via the microcomputer interface 97. When the peak level of the VCA 82 output is at or below the first reference level as shown in FIG. 3, the comparator 951 outputs a H level to put the counter 953 in a count-up mode. On the other hand, when the peak level of the VCA 82 output is above the first reference level as shown in FIG. 3, the comparator 951 outputs a L level to put the counter 953 in a count-down mode.

The hold range determining section 952 determines the hold range based on the first reference level and hold range setting value supplied from the microcomputer 200 via the microcomputer interface 97. Note that the hold range setting value is a pair of values relative, e.g., to the first reference level, which are the upper and lower limits of the hold range. If the peak level of the VCA 82 output supplied from the A/D converter 94 is within the hold range when and after intersecting with the first reference level as shown in FIG. 4, the hold range determining section 952 outputs the H level to make the counter 953 hold its preceding value at the output. On the other hand, if the peak level of the VCA 82 output is outside the hold range, the hold range determining section 952 outputs the L level to make the counter 953 output its count as usual.

Note that from when the peak level of the VCA 82 output is outside the hold range until intersecting with the first reference level, even when the peak level of the VCA 82 output is within the hold range, the hold range determining section 952 maintains its output at the L level so as not to control the counter 953 to hold its preceding value at the output. By this means, the time that the peak level of the VCA 82 output takes to settle at the first reference level can be shortened.

The counter 953 is constituted by an up/down counter, and has a U/D terminal to have the output of the comparator 951 inputted, a HOLD terminal to have the output of the hold range determining section 952 inputted, a CLK terminal to have predetermined counter clocks inputted, and a Q terminal to output the count of count-up/down. The counter 953 gets in an operation mode, either count-up, count-down, or count-hold (holding its preceding value), on the basis of the output of the comparator 951 and on the output of the hold range determining section 952 as shown in FIG. 5.

That is, when the outputs of the comparator 951 and the hold range determining section 952 are both at the L level, the counter 953 counts down. When the output of the comparator 951 is at the H level and the output of the hold range determining section 952 is at the L level, the counter 953 counts up. When the output of the hold range determining section 952 is at the H level, the counter 953 holds its preceding count value regardless of the output of the comparator 951, <<Operation of the VCA Controller>>

Figure 6:
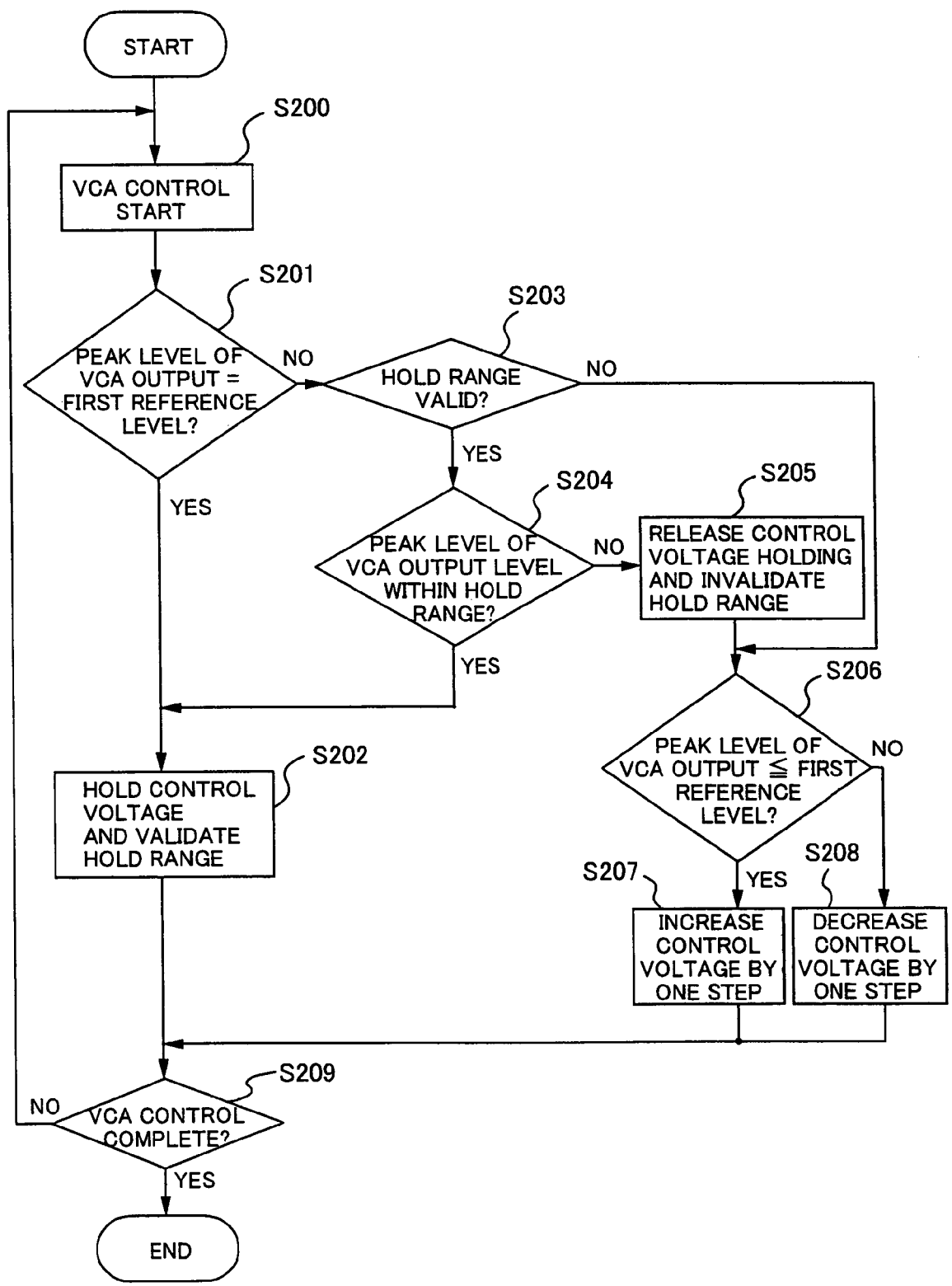
FIG. 6 is a flow chart illustrating the operation of the VCA controller according to the first embodiment of the present invention.

The operation of the VCA controller 95 will be described based on the flow chart of FIG. 6.

First, after the first reference level and the hold range setting value are supplied from the microcomputer 200 via the microcomputer interface 97, the VCA controller 95 starts VCA control (S200). The A/D converter 94 samples the peak levels of the VCA 82 output detected by the peak level detector 83 at a predetermined sampling frequency and quantizes the sampled peak levels to quantization numbers. In the description below, unless otherwise stated, the peak level of the VCA 82 output refers to the peak level of the VCA 82 output sampled and quantized by the A/D converter 94.

When the peak level of the VCA 82 output substantially coincides with the first reference level (S201; YES), the VCA controller 95 makes/keeps the hold range valid and controls the control voltage supplied to the VCA 82 to be held at its preceding value (S202). Thus, it does not happen that VCA control is performed in spite of the peak level of the VCA 82 being settling substantially at the first reference level, and thereby the peak level of the VCA 82 output moves away from the first reference level and becomes unstable.

When the peak level of the VCA 82 output does not substantially coincide with the first reference level (S201: NO) and in addition the hold range is valid (S203: YES), if the peak level of the VCA 82 output is within the hold range (S204: YES), the VCA controller 95 controls the control voltage supplied to the VCA 82 to be held at its preceding value (S202), and if the peak level of the VCA 82 output is outside the hold range (S204: NO), the VCA controller 95 releases the holding of the control voltage supplied to the VCA 82 at its preceding value and invalidates the hold range (S205). That is, when the peak level of the VCA 82 output does not substantially coincide with the first reference level but is within the hold range, the peak level of the VCA 82 output is taken as being settling, and the control voltage supplied to the VCA 82 is controlled to be held at its preceding value. On the other hand, when the peak level of the VCA 82 output is outside the hold range, usual VCA control not using the hold range is performed to make the peak level of the VCA 82 output coincide with the first reference level.

When the peak level of the VCA 82 output does not substantially coincide with the first reference level (S201: NO), if the hold range is invalid beforehand (S203: NO), or if the peak level of the VCA 82 output is out of the hold range and thus the hold range has switched to being invalid (S205), the control voltage supplied to the VCA 82 is adjusted in level as follows: when the peak level of the VCA 82 output is at or below the first reference level (S206: YES), the control voltage supplied to the VCA 82 is raised by one step (S207), and when the peak level of the VCA 82 output is above the first reference level (S206: NO), the control voltage supplied to the VCA 82 is lowered by one step (S208).

The VCA controller 95 repeats the above steps S201 through S208 until the end of VCA control (S209: YES), and thereby can accommodate to the level variation of the light-detected signal.

<<Example of the Operation of the LSI>>

Figure 7:
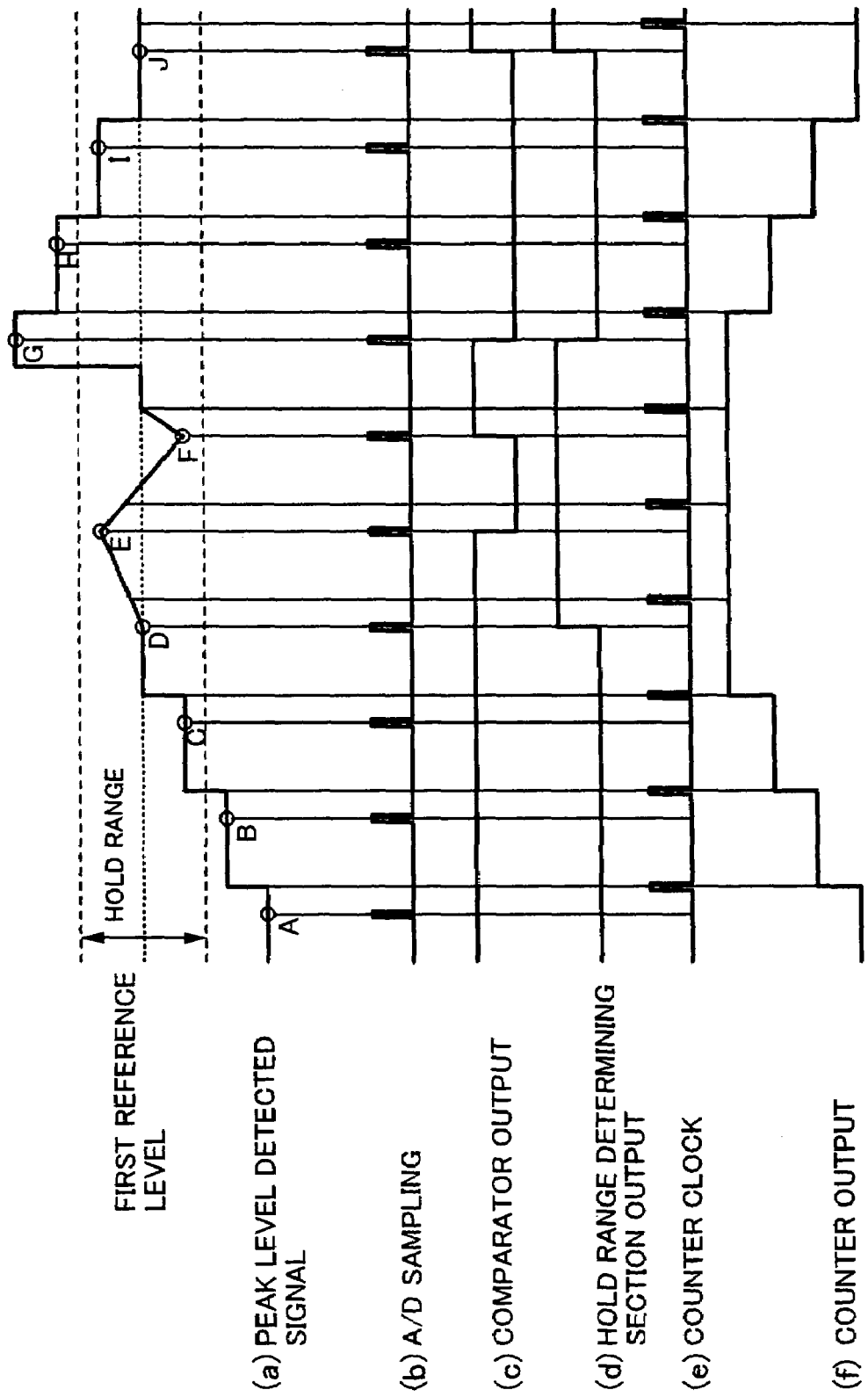
FIG. 7 is a diagram for explaining the operation of a digital signal processing section according to the first embodiment of the present invention.

The operation of the optical disk signal processing LSI 70 will be described specifically based on FIG. 7. Note that (a) shows the output waveform of the peak level detector 83, (b) shows the waveform of the sampling control signal for the A/D converter 94, (c) shows the output waveform of the comparator 951, (d) shows the output waveform of the hold range determining section 952, (e) shows the waveform of the counter clocks for the counter 953, and (f) shows the output waveform of the counter 953.

===Sampling Points A through D===

It is assumed that VCA control starts when the peak level of the VCA 82 output for the signal of information read out by the optical pickup 20 from the optical disk 10 is at "A", and thereafter the peak level of the VCA 82 output detected by the peak level detector 83 starts to increase stepwise. The A/D converter 94 samples and quantizes the peak level of the VCA 82 output detected by the peak level detector 83 at each sampling point according to the predetermined sampling frequency. Meanwhile, the comparator 951 compares the peak level of the VGA 82 output with the first reference level at each sampling point synchronously with the A/D converter 94. The counter 953 counts up or down on the basis of the comparing result of the comparator 951 at the counter clocks having the same frequency as the sampling frequency and being delayed in phase from the respective sampling points.

Because from sampling point A until sampling point D the peak levels of the VCA 82 output are at or below the first reference level, the comparator 951 outputs the H level. Although the peak level of the VCA 82 output is within the hold range at sampling point C, in order to make the peak level of the VCA 82 output quickly approach the first reference level, the hold range determining section 952 maintains its output at the L level from sampling point A until sampling point D, and upon sampling point D, switches its output from the L level to the H level.

Thus, because from sampling point A until sampling point D the output of the comparator 951 is at the H level and the output of the hold range determining section 952 is at the L level, the counter 953 continues to count up at the counter clocks having the predetermined clock frequency. Then, after sampling point D, the counter 953 holds its preceding count value.

===Sampling Points E through F===

At sampling point E, the peak level of the VCA 82 output is within the hold range and above the first reference level. Hence, upon sampling point E, the output of the comparator 951 changes from the H level to the L level, and the output of the hold range determining section 952 remains at the H level. Thus, the counter 953 continues to hold the preceding count value.

At sampling point F, the peak level of the VCA 82 output is within the hold range and not above the first reference level. Hence, upon sampling point F, the output of the comparator 951 changes from the L level to the H level, and the output of the hold range determining section 952 remains at the H level. Thus, the counter 953 continues to hold the preceding count value.

===Sampling Points G through J===

At sampling point G, the peak level of the VCA 82 output is outside the hold range and above the first reference level. Hence, upon sampling point G, the output of the comparator 951 changes from the H level to the L level, and the output of the hold range determining section 952 changes from the H level to the L level. Thus, the counter 953 starts to count down at counter clocks, and thereby the peak level of the VCA 82 output detected by the peak level detector 83 decreases stepwise.

At sampling point H, the peak level of the VCA 82 output is in the same state as at sampling point G. Hence, the counter 953 continues to count down.

The peak level of the VCA 82 output has decreased stepwise, and thus at sampling point I the peak level of the VCA 82 output is in the hold range. However, in order to make the peak level of the VCA 82 output quickly approach the first reference level, the hold range determining section 952 maintains its output at the L level, thereby not controlling the counter 953 to hold its preceding count value. As a result, until sampling point J at which the peak level of the VCA 82 output coincides with the first reference level, the counter 953 continues to count down.

<<Example of Effects>>

In the above first embodiment, even when minute level variation of the light-detected signal occurs due to noise or the like, if the peak level of the light-detected signal at the VCA 82 output is within the hold range, the control voltage supplied to the VCA 82, that is, the variable gain of the VCA 82 is held at its preceding value. As a result, the level of the light-detected signal output from the VGA 82 is stabilized, and thus, various optical disk playback processes in the digital signal processing section 90 at the stage following the VCA 82 can be appropriately performed.

In the above first embodiment, compared with another mechanism wherein the control voltage is held by a hold circuit using a capacitor, the complex analog adjustment of the capacitance of the capacitor, a time constant, and the like is unnecessary.

In the above first embodiment, when the peak level of the light-detected signal enters the hold range, first the VCA controller 95 dedicates itself to making the peak levels approach the first reference level. As a result, the time that the peak level of the light-detected signal takes to settle at the first reference level can be shortened.

In the above first embodiment, the first reference level and the hold range are adjustable arbitrarily through software processing of the microcomputer 200. By this means, the peak level of the light-detected signal at the VCA 82 output can be easily adjusted to an appropriate level according to the specification of the optical disk system.

Second Embodiment

<<DC Offset Adjustment>>

As mentioned above, the optical disk signal processing LSI 70 is embodied as an integrated circuit wherein the analog signal processing section 80 and the digital signal processing section 90 are integrated into one chip with a CMOS process technology. Because analog circuits using the CMOS process technology operate at lower voltages compared with bipolar-type analog circuits, it is difficult to secure a dynamic range in the analog signal processing section 80.

Furthermore, the DC (direct current) level contained in the light-detected signal may cause the level of the light-detected signal obtained from the optical disk 10 not to be within the dynamic range of the preamplifier 81 and the VCA 82, and part of the light-detected signal is possibly cut off. Thus, the levels detected by the peak level detector 83 may deviate, and the VCA control to make the levels being detected almost coincide with the first reference level may not be appropriately performed.

Accordingly, the optical disk signal processing LSI 70 is provided with a DC offset adjustment function to adjust the DC level contained in the light-detected signal to a predetermined reference level.

<<Optical Disk System>>

Figure 8:
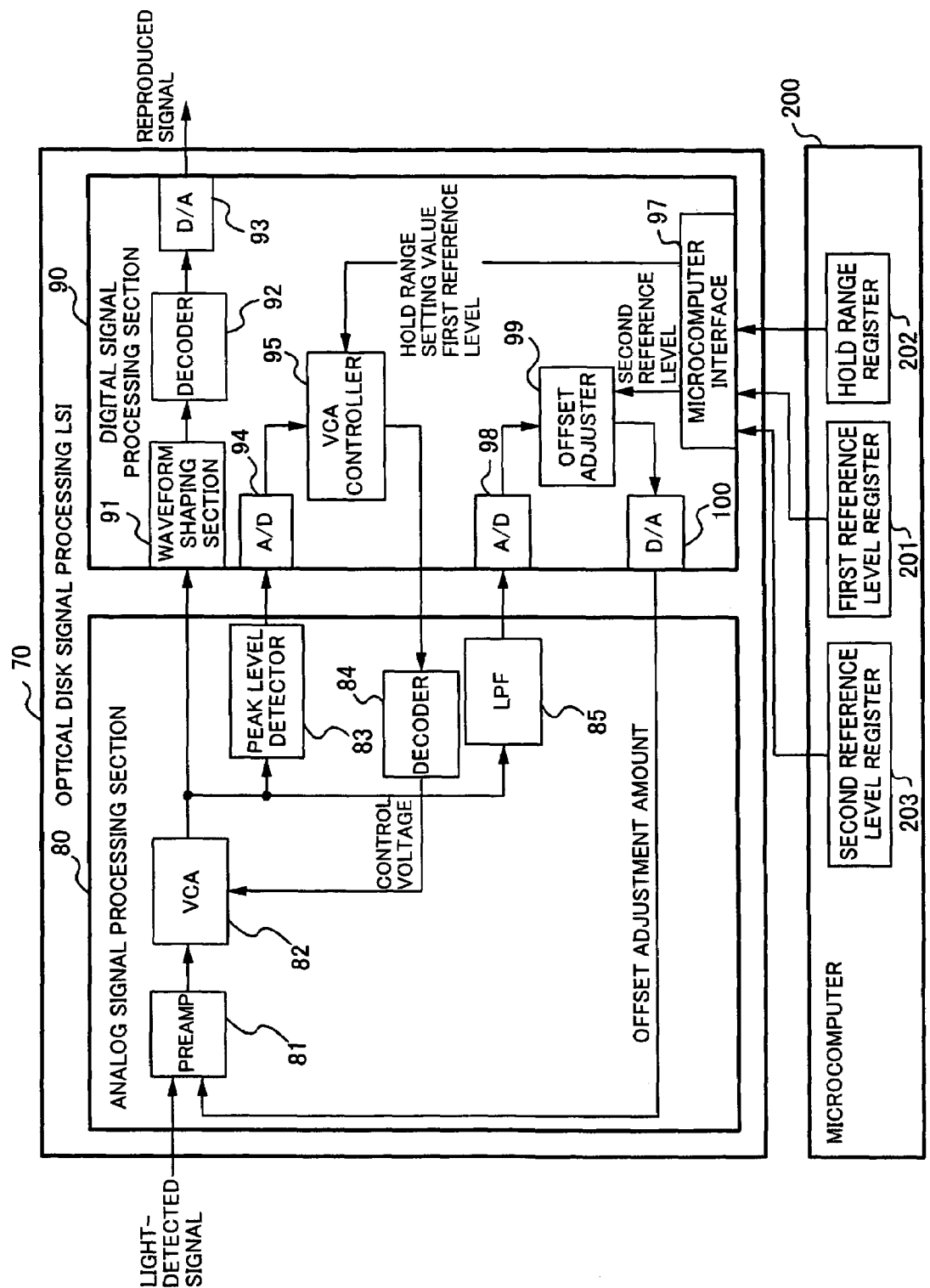
FIG. 8 is a diagram illustrating the configuration of an optical disk system according to a second embodiment of the present invention.
Figure 9:
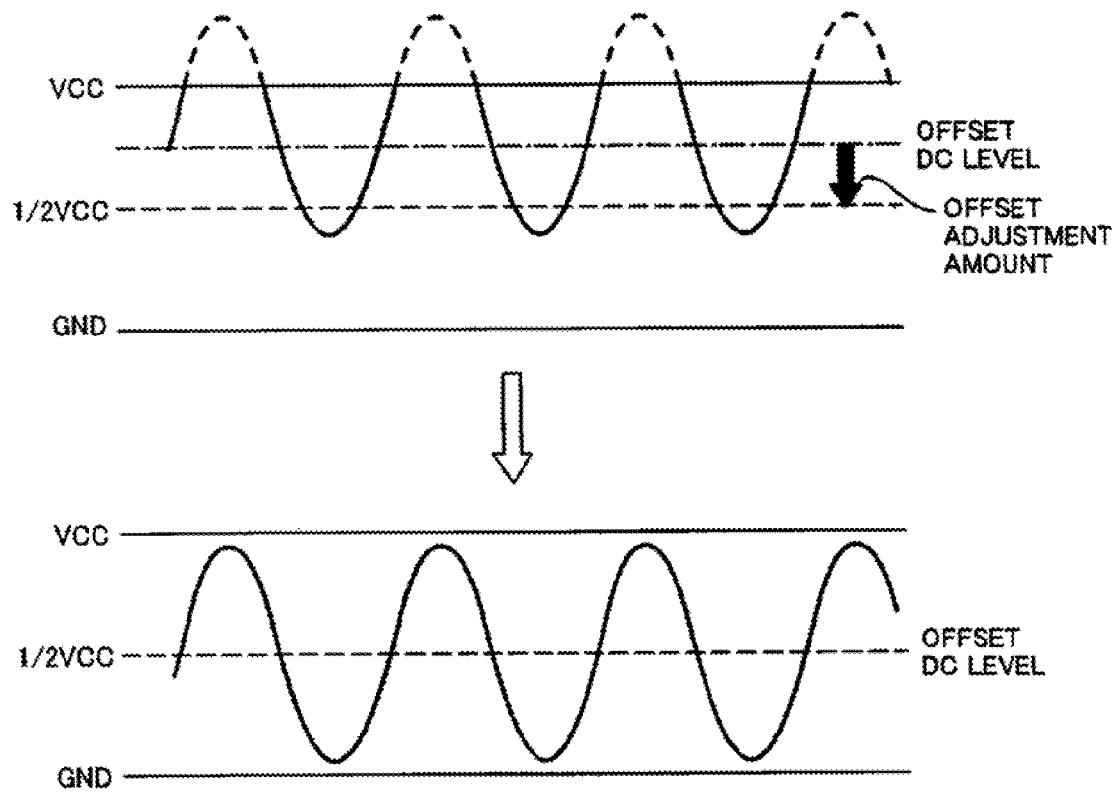
FIG. 9 is a diagram for explaining the operation of an offset adjuster according to the second embodiment of the present invention.

With reference to FIG. 9, the configuration and operation of an optical disk system with the DC offset adjustment function according to a second embodiment of the present invention will be described based on FIG. 8. Like components as in FIG. 1 are denoted by the same reference numerals with a description thereof omitted. For simplicity of description, in FIG. 8, the timing controller 204 of the microcomputer 200 and the timing signal generator 96 of the digital signal processing section 90 shown in FIG. 1 are omitted.

The microcomputer 200 is further provided with a second reference level register 203 to store a second reference level that is a reference for the DC level of the VCA 82 output. The second reference level is supplied to an offset adjustor 99 via the microcomputer interface 97.

The analog signal processing section 80 is further provided with an LPF (Low Pass Filter) 85. The LPF 85 is for detecting the DC level contained in the VCA 82 output.

The digital signal processing section 90 is further provided with an A/D converter 98, the offset adjustor 99, and a D/A converter 100.

The A/D converter 98 converts the DC level of the VCA 82 output detected by the LPF 85 to digital signal form at a predetermined sampling frequency.

The offset adjustor 99 compares the DC level of the VCA 82 output A/D-converted by the A/D converter 98 with the second reference level supplied from the microcomputer 200 via the microcomputer interface 97. The adjustment amount by which to shift the offset DC level in the preamplifier 81 so as to make the DC level of the VCA 82 output substantially coincide with the second reference level of, e.g., half a supply voltage VCC (hereinafter called an offset adjustment amount) is set as shown in FIG. 9.

The D/A converter 100 converts the offset adjustment amount set by the offset adjustor 99 to analog form and supplies to the preamplifier 81. As a result, the DC offset in the preamplifier 81 is adjusted such that the DC level of the light-detected signal having gone through the preamplifier 81 and the VCA 82 substantially coincides with the second reference level.

In the above embodiment, the function of the offset adjustor 99 of the digital signal processing section 90 can be realized by the microcomputer 200. In this case, the DC level of the VCA 82 output A/D-converted by the A/D converter 98 is supplied to the microcomputer 200 via the microcomputer interface 97, and the microcomputer 200 sets such an offset adjustment amount as to make the DC level of the VCA 82 output coincide with the second reference level and supplies to the D/A converter 100 via the microcomputer interface 97. As a result, the DC offset in the preamplifier 81 is adjusted by the microcomputer 200.

Alternatively, the DC offset adjustment can be performed in the VCA 82, but because the light-detected signal immediately after detected by the optical pickup 20 is unstable in level, part of the waveform of the light-detected signal may be cut off in the preamplifier 81, and thus the VCA 82 may be unable to appropriately perform the DC offset adjustment. Hence, the DC offset adjustment is preferably performed in the preamplifier 81 as above.

<<Example of Effects>>

In the above second embodiment, the DC level in the preamplifier 81 at the stage preceding the VCA 82 is controlled to substantially coincide with the second reference level. As a result, the level of the light-detected signal supplied from the preamplifier 81 to the VCA 82 becomes likely to fall within the dynamic range of the VCA 82, and the level of the light-detected signal outputted from the VCA 82 is further stabilized. Thus, various optical disk playback processes can be more appropriately performed in the digital signal processing section 90 at the stage following the VCA 82.

Third Embodiment

<CVCA Controller>>

An optical disk system according to a third embodiment of the present invention is the same in configuration as the first embodiment shown in FIG. 1 or the second embodiment shown in FIG. 8.

With reference to FIG. 11 as needed, the configuration and operation of a VCA controller 95 according to the third embodiment of the invention will be described based on FIG. 10. The VCA controller 95 is an example of a "gain adjuster" according to the third embodiment of the invention.

Figure 10:
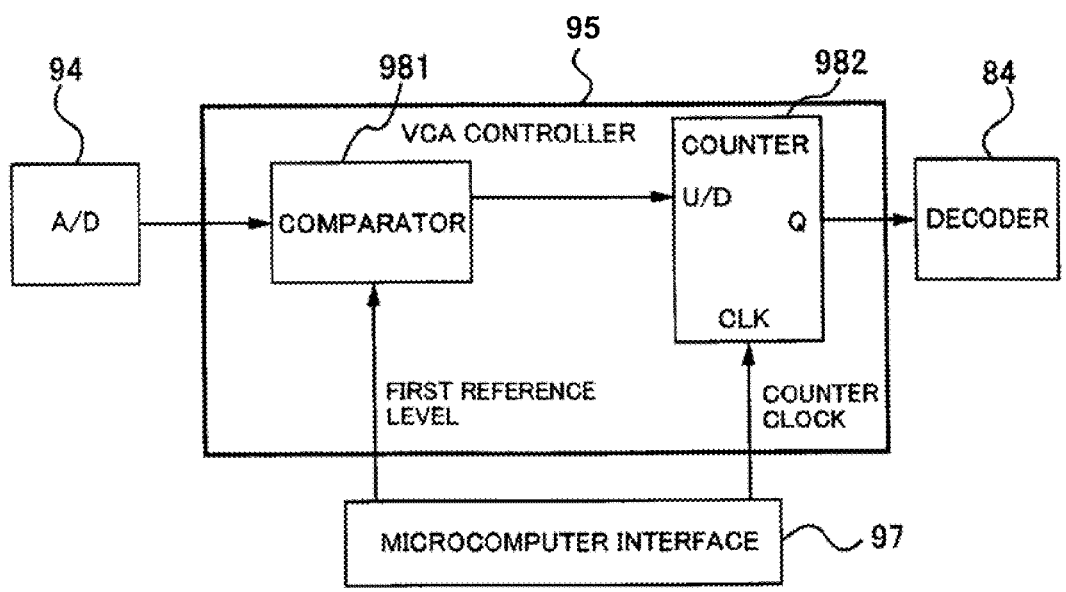
FIG. 10 is a diagram illustrating the configuration of a VCA controller according to a third embodiment of the present invention.

As shown in FIG. 10, the VCA controller 95 comprises a comparator 981 and a counter 982.

The comparator 981 compares the peak levels of the VCA 82 output supplied from the A/D converter 94 with the first reference level supplied from the microcomputer 200 via the microcomputer interface 97. When the peak level of the VCA 82 output is at or below the first reference level as shown in FIG. 11, the comparator 981 outputs the H level to put the counter 982 in a count-up mode. On the other hand, when the peak level of the VCA 82 output is above the first reference level, the comparator 981 outputs the L level to put the counter 982 in a count-down mode.

The Counter 982 is constituted by an up/down counter, and has a U/D terminal to have the output of the comparator 981 inputted, a CLK terminal to have inputted thereto counter clocks outputted from the timing signal generator 96, and a Q terminal to output the count of count-up/down.

The counter 982 gets in an operation mode, either count-up or count-down, on the basis of the output of the comparator 981. That is, the counter 982 counts down when the output of the comparator 981 is at the L level and counts up when at the H level.

<<Relationship Between Counter Clock Frequency and Sampling Frequency>>

In the third embodiment of the invention, a ratio of the counter clock frequency of the counter 982 to the sampling frequency of the A/D converter 94 can be changed arbitrarily. For this case, the operation of the optical disk signal processing LSI 70 will be described based on specific examples of FIGS. 12, 13, and 14.

Figure 12:
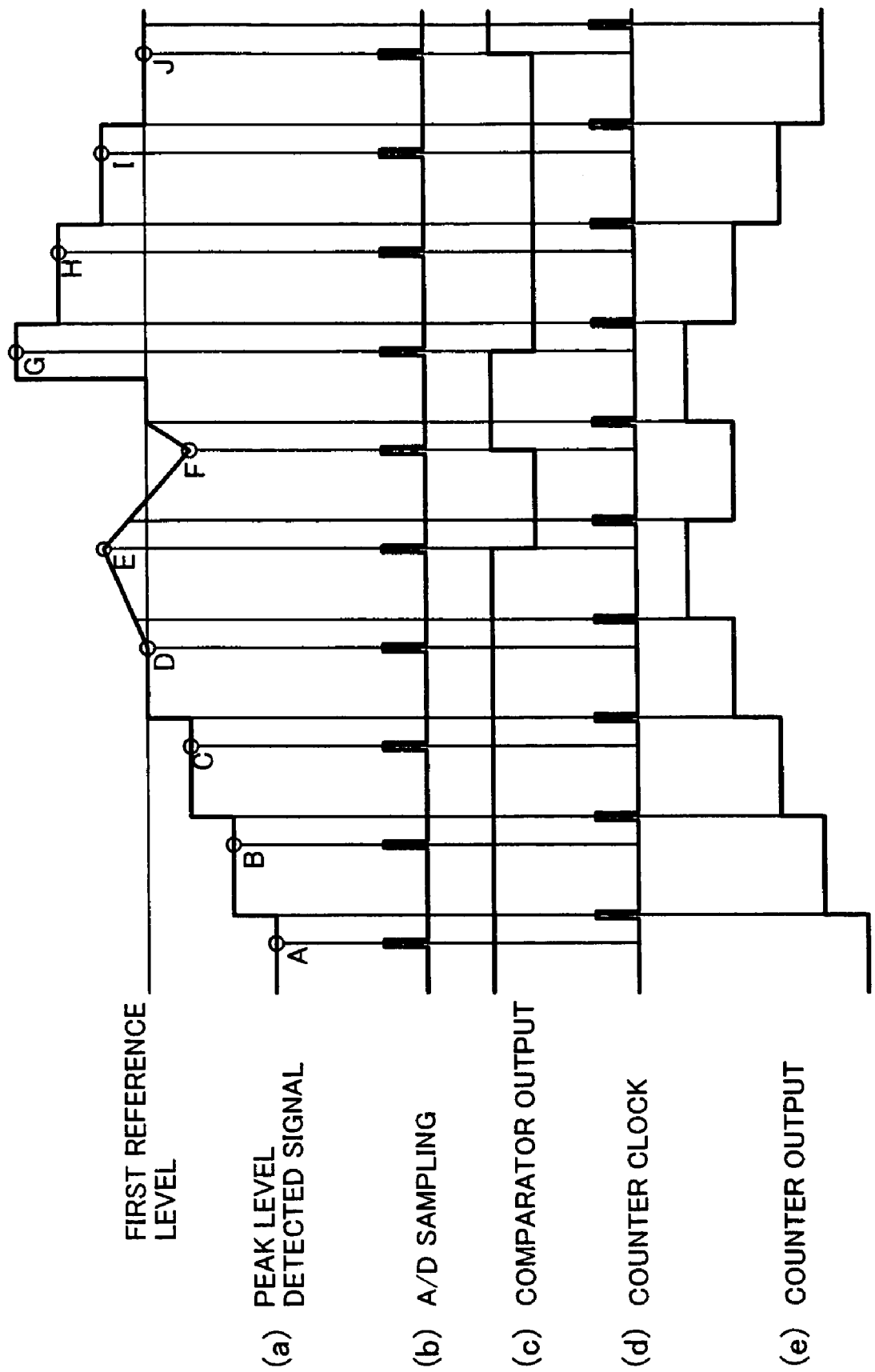
FIG. 12 is a diagram for explaining an operation of a digital signal processing section according to the third embodiment of the present invention.
Figure 13:
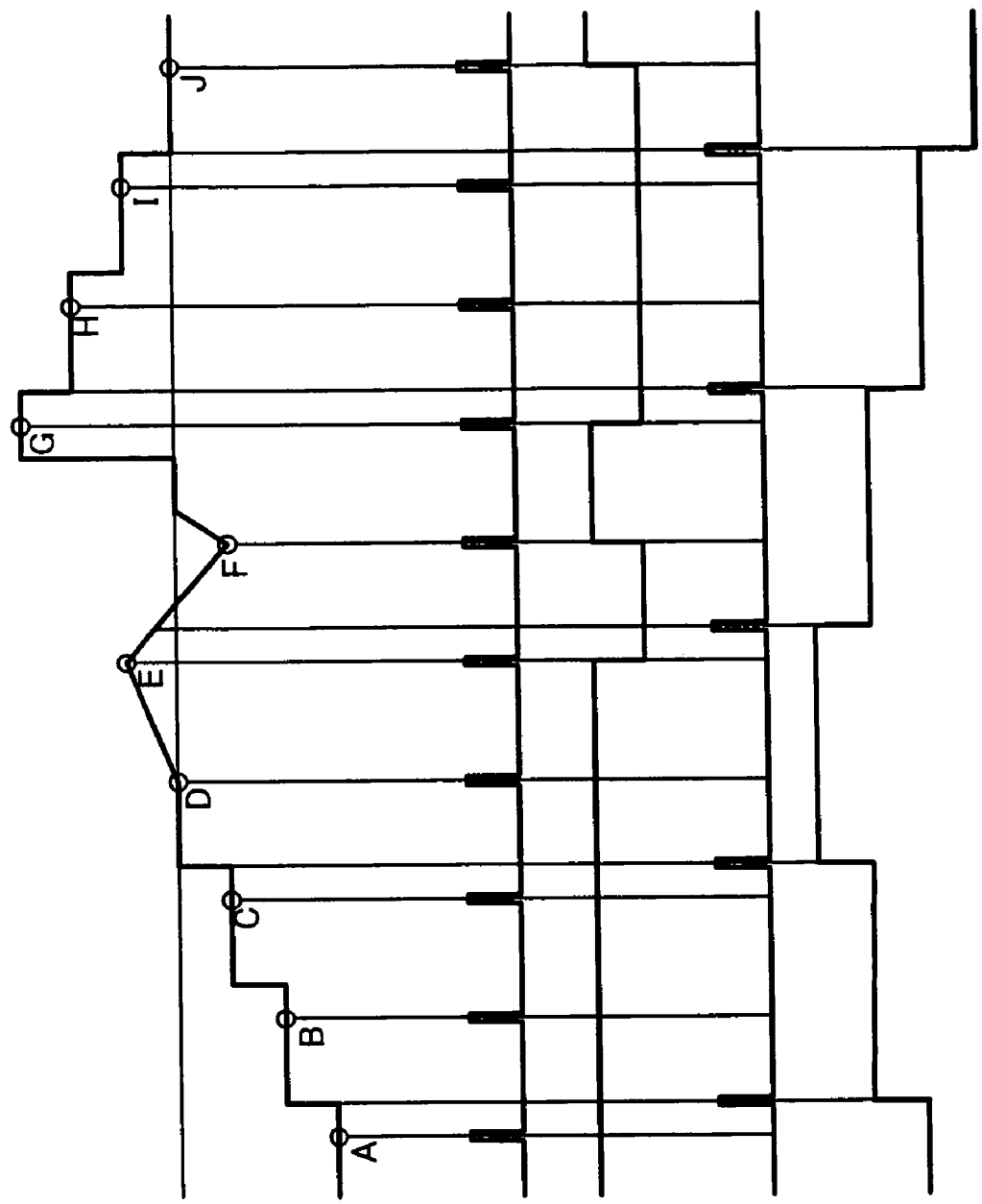
FIG. 13 is a diagram for explaining an operation of the digital signal processing section according to the third embodiment of the present invention.
Figure 14:
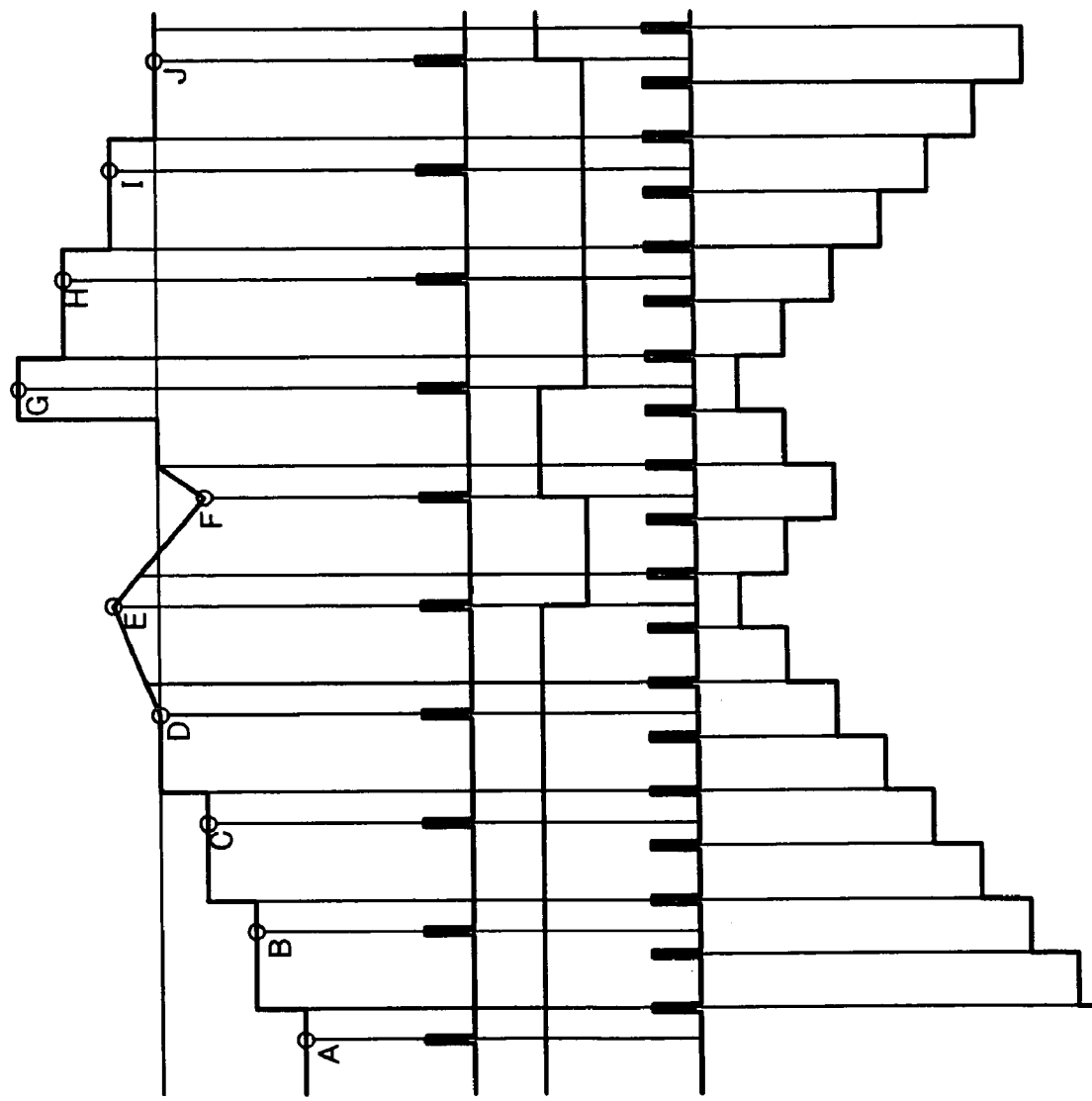
FIG. 14 is a diagram for explaining an operation of the digital signal processing section according to the third embodiment of the present invention.

Note that FIG. 12 shows the case where the counter clock frequency is set equal to the sampling frequency, FIG. 13 shows the case where the counter clock frequency is set lower than the sampling frequency, and FIG. 14 shows the case where the counter clock frequency is set higher than the sampling frequency. In FIGS. 12, 13, and 14, (a) shows the output waveform of the peak level detector 83, (b) shows the waveform of the sampling control signal for the A/D converter 94, (c) shows the output waveform of the comparator 981, (d) shows the waveform of the counter clocks for the counter 982, and (e) shows the output waveform of the counter 982.

<<Case of Counter Clock Frequency=Sampling Frequency>>

The case where the counter clock frequency is set equal to the sampling frequency will be described based on FIG. 12.

It is assumed that VCA control starts when the peak level of the VCA 82 output for the signal of information read out by the optical pickup 20 from the optical disk 10 is at "A", and thereafter the peak level of the VCA 82 output detected by the peak level detector 83 starts to increase stepwise. The A/D converter 94 samples and quantizes the peak level of the VCA 82 output at each sampling point according to the A/D sampling control signal. Meanwhile, the comparator 981 compares the peak level of the VCA 82 output with the first reference level at each sampling point synchronously with the A/D converter 94.

The counter 982 counts up or down on the basis of the comparing result of the comparator 981 at counter clocks having the same frequency as the sampling frequency and being delayed in phase from the respective sampling points. Note that to synchronize the counter 982 with the A/D converter 94 and the comparator 981, that is, to make the counter clock signal and the A/D sampling control signal be exactly in-phase, the signals may be adjusted. As a result, responsiveness of VCA control to the level variation of the light-detected signal is improved.

Since from sampling point A until sampling point D the peak levels of the VCA 82 output are at or below the first reference level, the comparator 981 outputs the H level. That is, upon sampling points A through D the counter 982 counts up at the counter clocks consecutively.

At sampling point E, the peak level of the VCA 82 output sampled is above the first reference level. Hence, the output of the comparator 981 changes from the H level to the L level, and the counter 982 counts down at the counter clock in this sampling cycle.

At sampling point F, the peak level of the VCA 82 output sampled is below the first reference level. Hence, the output of the comparator 981 changes from the L level to the H level, and thus, the counter 982 counts up at the counter clock in this sampling cycle.

At sampling point G, the peak level of the VCA 82 output sampled is above the first reference level. Hence, the output of the comparator 981 changes from the H level to the L level, and the counter 982 counts down at the counter clock in this sampling cycle.

Thereafter, the peak level of the VCA 82 output sampled continues to be above the first reference level, and thus, the counter 982 continues to count down at counter clocks.

<<Case of Counter Clock Frequency<Sampling Frequency>>

As an example of the case where the counter clock frequency is set lower than the sampling frequency, the case where the counter clock frequency is set to half of the sampling frequency will be described based on FIG. 13.

In the case where the counter clock frequency is set to half of the sampling frequency as shown in FIG. 13, during twice of sampling by the A/D converter 94, count-up/down by the counter 982 is performed only once. Thus, compared with the case where the counter clock frequency is set equal to the sampling frequency, responsiveness of VCA control to the level variation of the light-detected signal is slower.

Hence, for example for the case where sudden, steep pulse-like variation occurs in the peak level of the light-detected signal due to noise, it is preferable that the counter clock frequency is intentionally set lower than the sampling frequency. That is, the number of times when the counter 982 counts up/down on the basis of the peak levels due to noise of the VCA 82 output, that is, when the VCA control follows noise is reduced.

<<Case of Counter Clock Frequency>Sampling Frequency>>

As an example of the case where the counter clock frequency is set higher than the sampling frequency, the case where the counter clock frequency is set to twice the sampling frequency will be described based on FIG. 14.

In the case where the counter clock frequency is set to twice the sampling frequency as shown in FIG. 14, during once of sampling by the A/D converter 94, count-up/down by the counter 982 is performed twice. Thus, the number whereby the count of the counter 982 changes and thus the amount whereby the control voltage supplied to the VCA 82 changes according to the count of the counter 982 are doubled. In other words, compared with the case where the counter clock frequency is set equal to the sampling frequency, the resolution of the VCA control in adjusting the level of the light-detected signal is halved.

That is, compared with the case where the counter clock frequency is set equal to the sampling frequency, the accuracy of the VCA control in adjusting the level of the light-detected signal is reduced, and responsiveness of the VCA control to the level variation of the light-detected signal becomes faster. Hence, in the case where it is intended to make the level of the light-detected signal rapidly approach the first reference level as the target upon the start of the VCA control with ignoring the accuracy in adjusting the level of the light-detected signal, it is preferable that the counter clock frequency is intentionally set higher than the sampling frequency.

<<Example of Effects>>

In the above third embodiment, with the simple mechanism wherein the ratio of the counter clock frequency to the sampling frequency is variable, when the counter clock frequency is set lower than the sampling frequency, responsiveness of the VCA control to the level variation of the light-detected signal can be intentionally made slower. As opposed to this, when the counter clock frequency is set higher than the sampling frequency, the accuracy of the VCA control in adjusting the level of the light-detected signal can be reduced. That is, by changing the ratio of the counter clock frequency to the sampling frequency, response of the VCA control to the level variation of the light-detected signal can be changed intentionally. As a result, the adjustment of the light-detected signal level by the VCA control is improved in flexibility, and can be performed appropriately and easily.

In the above third embodiment, by setting the counter clock frequency equal to the sampling frequency, the accuracy of the VCA 82 in adjusting the level of the light-detected signal and responsiveness thereof to the level variation of the signal can be improved in a balanced manner and easily.

In the above third embodiment, by adopting a mechanism wherein only the counter clock frequency is variable, the adjustment of the ratio of the counter clock frequency to the sampling frequency can be easily realized.

In the above third embodiment, the timing controller 204 of the microcomputer 200 can easily, set an appropriate counter clock frequency according to the specification of an optical disk system.

Although the preferred embodiments of the present invention have been described, the above embodiments are provided to facilitate the understanding of the present invention and not intended to limit the present invention. It should be understood that various changes and alterations can be made therein without departing from spirit and scope of the invention and that the present invention includes its equivalents.

What is claimed is:

1. A signal processing apparatus for an optical disk system, comprising:
    a variable gain amplifier that amplifies with a variable gain a light-detected signal obtained from an optical disk on which to perform playback processing so as to make a level of the light-detected signal coincide with a first reference level;
    a comparator that compares the level of the light-detected signal amplified by the variable gain amplifier with the first reference level;
    a gain adjuster that generates and supplies a control signal to adjust the variable gain according to a result of the comparing to the variable gain amplifier; and
    a gain adjustment controller that:
        allows a level of the control signal of the gain adjuster to change during a period from a time when the level of the light-detected signal amplified by the variable gain amplifier falls within a level range including the first reference level from outside of the level range, to a time when the level of the light-detected signal coincides with the first reference level, and
        controls a level of the control signal of the gain adjuster to be held at its preceding value during a period that the level of the light-detected signal amplified by the variable gain amplifier is within the level range after a time when the level of the light-detected signal coincides with the first reference level.

2. The signal processing apparatus for the optical disk system according to claim 1,
    wherein the gain adjuster includes a counter which counts up when the comparing result indicates that the level of the light-detected signal amplified is not above the first reference level, and which counts down when the comparing result indicates that the level of the light-detected signal amplified is above the first reference level, and sets a level of the control signal according to the count value of the counter, and
    wherein when the level of the light-detected signal amplified is within the level range, the gain adjustment controller controls the count value of the counter to be held at its preceding value.

3. The signal processing apparatus for the optical disk system according to claim 1, wherein the signal processing apparatus is connected to a microcomputer that controls the optical disk system overall, and the microcomputer sets the first reference level used in the comparator and the level range used in the gain adjustment controller.

4. The signal processing apparatus for the optical disk system according to claim 1, further comprising:
    an offset adjustable preamplifier that is provided in between an optical pickup for obtaining the light-detected signal from the optical disk and the variable gain amplifier, and amplifies in level the light-detected signal obtained by the optical pickup and supplies an amplified signal to the variable gain amplifier; and
    an offset adjuster that adjusts the offset in the preamplifier so as to make a direct-current level of the light-detected signal further amplified by the variable gain amplifier coincide with a second reference level.

5. A signal processing method for an optical disk system which has a variable gain amplifier that amplifies with a variable gain a light-detected signal obtained from an optical disk on which to perform playback processing so as to make a level of the light-detected signal coincide with a first reference level, the method comprising the steps of:
    comparing the level of the light-detected signal amplified by the variable gain amplifier with the first reference level;
    generating and supplying a control signal to adjust the variable gain according to a result of the comparing to the variable gain amplifier;
    allowing a level of the control signal of the gain adjuster to change during a period from a time when the level of the light-detected signal amplified by the variable gain amplifier falls within a level range including the first reference level from outside of the level range, to a time when the level of the light-detected signal coincides with the first reference level; and
    controlling a level of the control signal to be held at its preceding value during a period that the level of the light-detected signal amplified by the variable gain amplifier is within the level range after a time when the level of the light-detected signal coincides with the first reference level.

* * * * *